United States Patent [19]

Sutter et al.

[11] 4,227,675
[45] Oct. 14, 1980

[54] BUTTERFLY VALVE STRUCTURE AND A SLEEVE THEREFOR

[75] Inventors: Jean G. Sutter, Villers-les-Nancy; Alain A. P. Percebois, Pont-a-Mousson, both of France

[73] Assignee: Pont-A-Mousson S.A., Nancy, France

[21] Appl. No.: 873,047

[22] Filed: Jan. 27, 1978

[30] Foreign Application Priority Data

Feb. 7, 1977 [FR] France .................. 77 03370

[51] Int. Cl.³ ............................................. F16K 1/226
[52] U.S. Cl. .................................... 251/173; 251/306
[58] Field of Search ........................ 251/173, 305, 306

[56] References Cited

U.S. PATENT DOCUMENTS

| 1,990,309 | 2/1935 | Phillips | 251/173 |
|---|---|---|---|
| 3,343,805 | 9/1967 | Felton | 251/306 |
| 3,603,341 | 9/1971 | Scaramucci | 251/306 |
| 3,633,872 | 1/1972 | Wright | 251/306 |
| 3,656,712 | 4/1972 | Bertrem | 251/306 |
| 3,666,233 | 5/1972 | Scaramucci | 251/306 |
| 3,675,677 | 7/1972 | Scaramucci | 251/306 |
| 3,776,509 | 12/1973 | Leblond | 251/306 |
| 3,779,512 | 12/1973 | Scaramucci | 251/306 |
| 3,790,130 | 5/1974 | Getty, Jr. | 251/306 |

FOREIGN PATENT DOCUMENTS

| 905372 | 1/1970 | Canada | 251/306 |
|---|---|---|---|
| 1311016 | 3/1973 | United Kingdom | 251/306 |

*Primary Examiner*—William R. Cline
*Assistant Examiner*—H. Jay Spiegel
*Attorney, Agent, or Firm*—Sughrue, Rothwell, Mion, Zinn and Macpeak

[57] ABSTRACT

In this butterfly valve structure having an elastic sleeve, an outer projection of the sleeve in the free state has the same sectional shape as a groove in the body of the valve. The radial thickness of the seat is at least equal to ten times the depth to which the valve member, when closed, penetrates into the seat. The depth of the groove is at least equal to 4/10 of the minimum radial thickness of the seat. The axial length of the bottom of the groove is of the same order of magnitude as that of the seat. The corners of the groove are rounded. This valve structure is of particular advantage for high temperature and/or when the valve member remains closed for a prolonged period.

14 Claims, 10 Drawing Figures

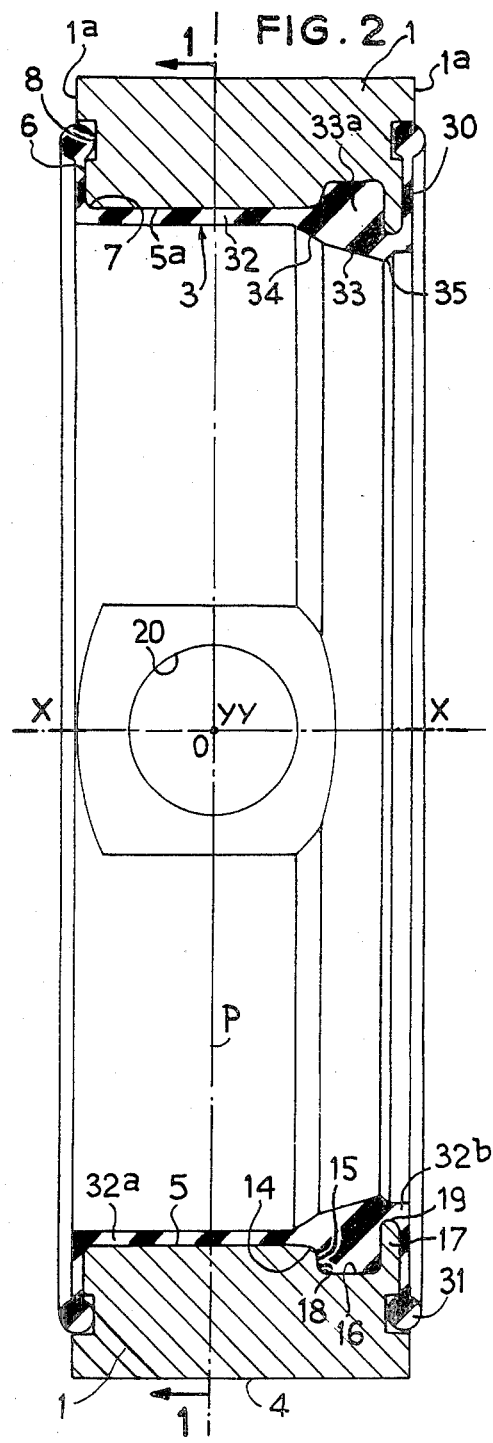
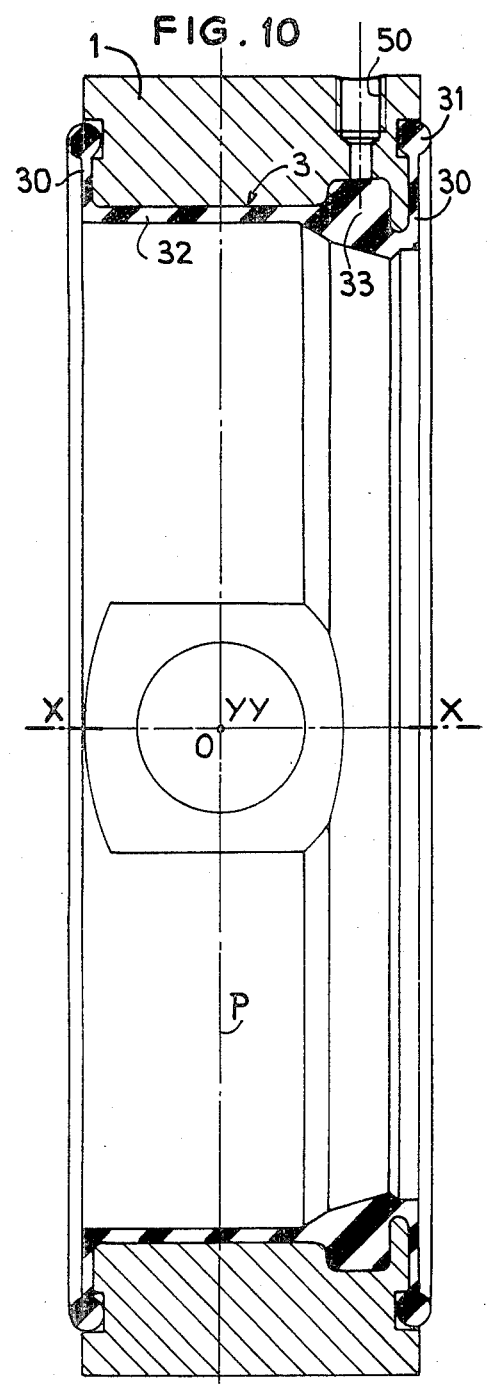

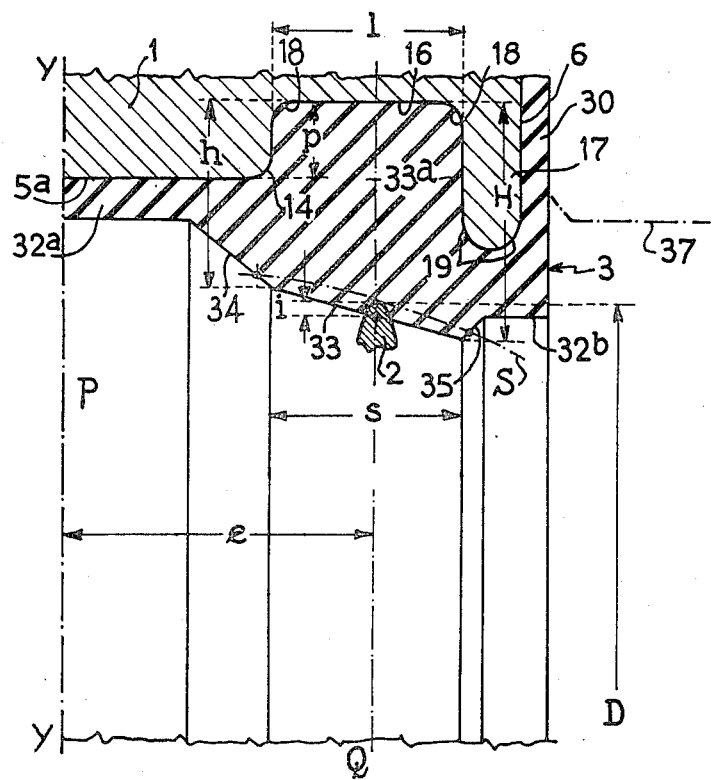
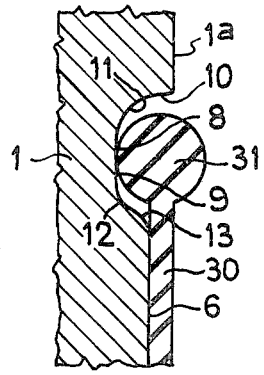
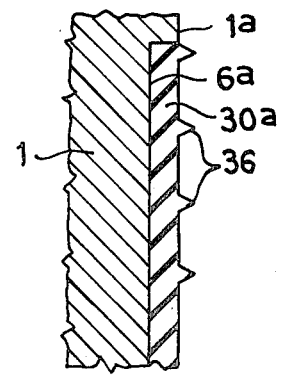
FIG. 3
FIG. 4
FIG. 5

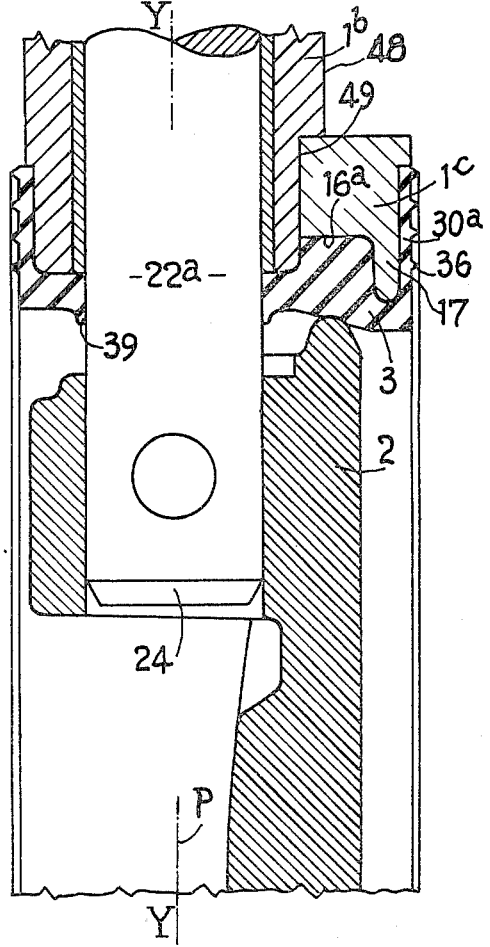
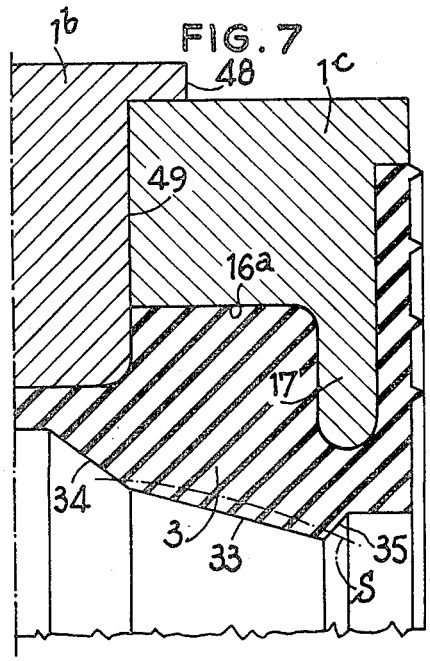
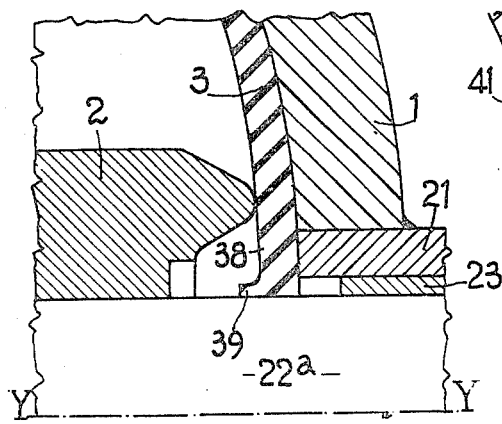
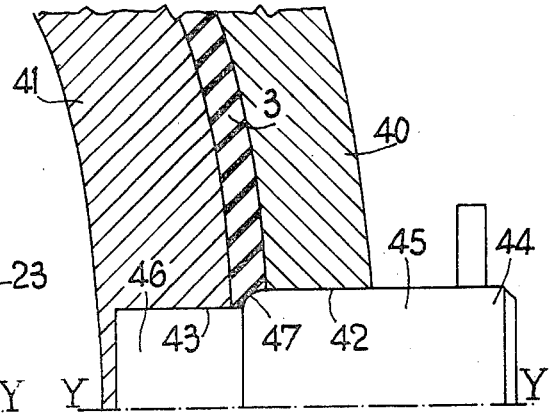

BUTTERFLY VALVE STRUCTURE AND A SLEEVE THEREFOR

The present invention relates to a butterfly valve structure having an elastically yieldable sealing sleeve in which the sleeve comprises a web having end flanges and further comprises, in the vicinity of the median plane of the closed valve member and on each side of said plane, a thicker portion which defines a seat and comprises an outer projection disposed in a groove in the body of the valve structure.

The body of butterfly valve structures of this type is provided, throughout the inner surface thereof, with an annular sleeve of compressible material. The seat of the sleeve is compressed by the periphery of the valve member when the latter reaches its closing position. This type of assembly is of particular interest: apart from the fact that the body is protected, the end flanges of the sleeve provide in a very simple manner a seal between the body and two flanges of the pipe elements to be connected thereto and the machining of the body is simplified.

However, the valve structures having a sleeve constructed heretofore are unsatisfactory in a number of respects. In particular, the creep of the sleeve under the effect of the closure is excessive notwithstanding the anchoring projection of the sleeve, especially when the valve structure operates at high temperature and the valve member remains in the closing position for a long period. The elastomer from which the sleeve is usually made creeps all the more under the pressure of application required for the obtainment of the seal, as the temperature is higher and the closure is prolonged. The result of this creep is that the sleeve escapes at the place of the seat. It tends in particular to move axially and/or to more or less retain the impression of the edge of the valve member with a formation of permanent inner radial beads or bulges on each side of this impression. Now it is clear that these beads are created by the removal of elastomer from the volume required to guarantee the seal in contact with the valve member and therefore to the detriment of this seal.

An object of the invention is to provide a butterfly valve structure having a sleeve which is sure in operation when closing off a hot fluid and remains of high fidelity in the course of time notwithstanding the increased creep of the compressible material of the sleeve that prolonged utilization inevitably produces.

According to the invention, there is provided a butterfly valve structure of the aforementioned type, wherein the projection has in the free state thereof the same sectional shape as the groove, the radial thickness of the seat is at least equal to ten times the depth to which the closed valve member penetrates the seat, the depth of the groove is at least equal to 4/10 of the minimum radial thickness of the seat, the axial length of the bottom of the groove is of the same order of magnitude as that of the seat, and the corners of the groove are rounded. When the butterfly valve member is offset or off centre, the body preferably comprises an annular inner tongue portion one face of which defines a wall of the groove and another face of which defines an end face of the body, two radially inner/corners of this tongue portion being rounded and the length of this tongue portion, measured from the inner end or bottom of the groove being at least equal to one half of the maximum radial thickness of the seat.

In the same case, in an advantageous embodiment, the body comprises a first member through which the shaft of the butterfly valve member extends and which is defined by a face constituting a first wall of the groove and a second member to which a part of the sleeve is adhered which is attached to the first member and defines the bottom and the other wall of the groove. It is in this way possible to produce an inseparable unit comprising the sleeve and the second member of the body by employing the second member as an insert which is previously treated for the purpose of achieving a good adherence and onto which the sleeve is moulded.

Advantageously, the valve member is carried by two semi-shafts which are separate and the web has in the free state thereof, in the region in which each one of the semishafts passes, an increased thickness in which there is formed an aperture which has the same diameter as the semi-shafts and is provided on a part of the length thereof located adjacent to the inner side of the sleeve, with a radial flange, the flanges constituting cylindrical lip portions gripping the semi-shafts in the assembled state of the valve structure.

Another object of the invention is to provide a sleeve for such a butterfly valve structure.

Further features and advantages of the invention will be apparent from the ensuing description which is given merely by way of a non-limitative example with reference to the accompanying drawings in which:

FIG. 2 is a sectional view of the valve structure taken on line 2—2 of FIG. 1, the valve member being omitted in this Figure;

FIG. 3 is a partial half-sectional view, to an enlarged scale, corresponding to FIG. 2 with the valve member being shown partly in the valve-closing position thereof;

FIG. 4 shows to an enlarged scale a detail of FIG. 2;

FIG. 5 shows in a similar manner a modification of the same detail;

FIG. 6 is a half-sectional view, taken on line 6—6 of FIG. 1, of a modification of the valve structure according to the invention, the butterfly valve member being shown in the valve-closing position thereof;

FIG. 7 shows to an enlarged scale a detail of FIG. 6;

FIG. 8 shows to an enlarged scale a detail of FIG. 1;

FIG. 9 is a view similar to FIG. 8 illustrating the manufacture of the part of the sleeve shown in FIG. 8, and FIG. 10 is a view similar to FIG. 2 of a modification of the valve structure according to the invention.

Figure 1:
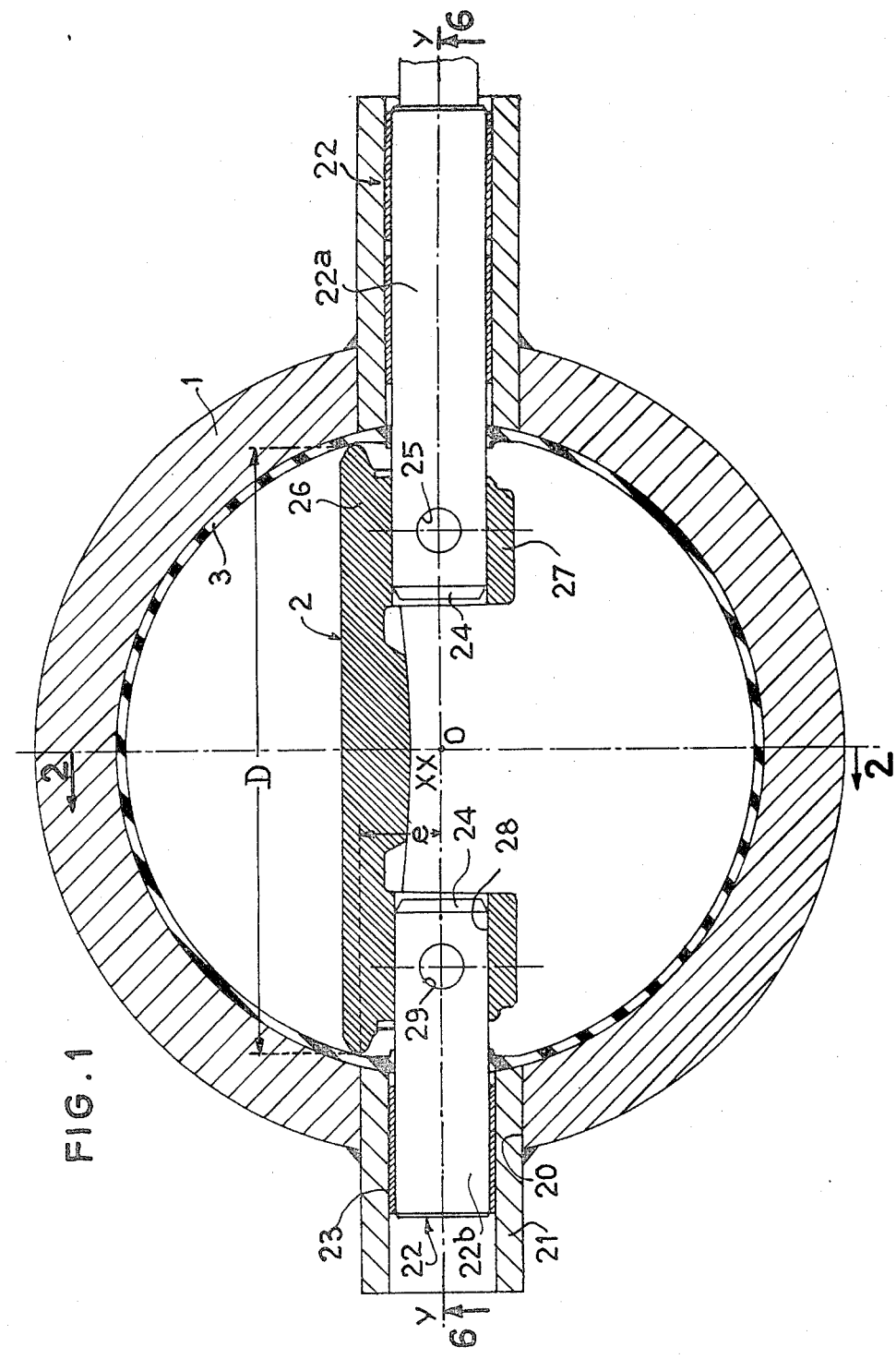
FIG. 1 is a sectional view of a butterfly valve structure according to the invention in the plane of the axis of rotation of the butterfly valve member, the latter being shown in the valve-opening position thereof.

The butterfly valve structure shown in FIGS. 1 to 4 comprises a valve body 1, a butterfly valve member 2 and an elastically yieldable sleeve 3. In the interest of clarity, certain proportions have not been conformed to in the drawings.

The metal body 1 has the general shape of a cylindrical ring having an axis X—X. The outer wall 4 of the body 1 is cylindrical and the inner wall 5 is cylindrical on the major part $5^a$ of the length thereof. At each end, the body 1 has a planar face $1^a$ in which there is formed a recess or counterbore 6 which is connected by a rounded or radiused corner 7 in the form of a quarter of a circle to the cylindrical part of the wall 5. In the radially outer part of the recess 6 there is formed a circular groove or recess 8 which has, as can be seen clearly in FIG. 4, a flat bottom or inner face 9 and a cylindrical outer wall 10. The bottom 9 is connected to the wall 10 by a rounded or radiused corner or fillet 11 in the form of a quarter of a circle and it is connected to the bottom of the recess 6 by two opposite rounded or radiused corners 12 and 13 of the same radius. The wall 10 of the groove 8 is connected by a right-angled corner to the planar end face $1^a$ of the valve body.

At one end of the body, the wall $5^a$ is connected by a rounded corner 14 to a radial wall 15 of an annular groove 16 having a cylindrical bottom or inner face which is defined, at the opposite end to the wall 14, by an inner radial tongue portion or flange 17 the inner radius of which is less than that of the cylindrical wall $5^a$. The bottom of the groove 16 is connected to the two radial lateral walls of this groove by identical rounded or radiused corners 18 and the inner end of the flange 17 is also defined by two rounded or radiused corners 19.

The body 1 (FIG. 1) is provided with two diametrally opposed bores 20 having the same axis Y—Y which is contained in a transverse plane P which is offset with respect to the general plane of symmetry of the body 1 and passes through the middle of the wall $5^a$. Fixed in each one of the bores is a bearing 21 which is internally flush with the cylindrical wall $5^a$ and has the same shape as the latter. A semi-shaft 22 is journalled in each of the bearings 21 with interposition of a self-lubricating bushing 23. The shaft $22^a$ of the two shafts 20 is connected to a manual or motor-driven (not shown) shifting device and the other shaft $22^b$ is freely journalled in the bearing therefor. The inner ends of the shafts 22 are spaced apart from each other and have a chamfer 24. A transverse aperture 25 extends through each shaft 22 in the vicinity of the end thereof.

The butterfly valve member 2 is of the offcentre or offset type and has a closing disc 26 which has a general shape which is roughly planar or lenticular and a diameter D and has on one side two lugs 27. These lugs are provided with bores 28 receiving without clearance the ends of the shafts 22, the shafts being prevented from rotating in the lugs by pins 29 which extend through the bores 28 and the apertures 25. The edge of the disc 26 is thinned down and rounded or radiused and is roughly symmetrical with respect to a plane located at a distance e from the axis Y—Y which is termed the offcentre or offset of the disc.

The sleeve 3, which is made for example from an elastomeric mixture or from another flexible material having similar properties, for example a sufficiently flexible thermoplastic mixture, has a semi-section having the general shape of a U which can be clearly seen in FIG. 2. The outer wall of the web 3 at rest, which is the inner wall of the U, has exactly the same shape as the inner wall 5 and the bottom of the recess 6 of the body 1. In other words, when the sleeve 3 is in position, it completely covers these portions of the valve body without being subjected to any marked stress. The ends of the end flanges 30 forming the branches of the U have the shape of an annular O-section bead or rib 31 the diameter of which is such that it bears slightly against the median part of the bottom of the corresponding groove 8 of the body 1 (FIG. 4) with each O-section bead extending distinctly beyond the corresponding face $1^a$ of the body 1.

The base of the U constituting the sleeve 3 is constituted in the major part of the length thereof by a thin web 32 in two portions, namely a portion $32^a$ covering the wall $5^a$, and a portion $32^b$ in the region of the flange 17. Only the portion $33a$ of the sleeve which is in the region of the groove 16 between the webs $32^a$ and $32^b$ is a thick portion. Indeed, in the region of this groove and on the same axial length, there extends a seat 33 whose inner wall is part-conical. In the direction of the axis of rotation of the valve member, the seat 33 is connected at a sharp corner to a part-conical portion 34 which is connected to the portion $32^a$ of the sleeve 3. In the opposite direction, a second part-conical portion 35 connects the seat to the portion $32^b$ of the sleeve.

The sleeve 3 and the valve body 1 have the following dimensional relationships (FIG. 3):

the depth p of the groove 16 is at least equal to 0.4 times the minimum thickness h of the thick portion $33a$;

the thickness of the thick portion $33a$, measured radially from the bottom of the groove 16 to the free surface is equal throughout this seat to at least ten times the interference fit, that is to say the depth to which the butterfly valve member 2 penetrates the seat 33 in the valve-closing plane Q thereof, which is located at a distance e from the axis Y—Y and is also the median plane of the groove 16.

Note in this respect that, owing to the tolerances of the diameter of the valve member, which diameter may be for example 80 to 400 mm, and the slight thickness of the seat with respect to this diameter, this thickness is so calculated that it remains greater than the value 10i corresponding to the effective interference observed in the most unfavorable case; it can therefore happen that, for a given valve structure, this thickness is distinctly greater than 10i;

the thickness of the web 32 of the sleeve is 3 mm; generally speaking it may be less than 2.5i but greater than 2 mm in the case where the sleeve is of an elastomer. This value of 2 mm indeed corresponds to a lower limit bearing in mind the possibilities of the moulding of the sleeve 3;

all the considered rounded corners have a radius of 2 mm which is the minimum value for the moulding of the sleeve and the machining of the body 1;

the flanges 30 have a thickness in the neighbourhood of the web 32 for the same reason; this thickness is equal to the depth of the recess 6;

the upper semi-conical portions 34 and 35 (FIG. 3) make with the axis X—X angles respectively between $-\arc\sin. 2e/D$ and $-60°$ on one hand, and $-\arc\sin. 2e/D$ and $+60°$ on the other;

the tongue portion 17 has a length, measured from the bottom of the groove 16, at least equal to one half of the maximum thickness H of the seat 33; in the illustrated embodiment, this length is 0.68 H;

the seat 33 is defined by the cone which is tangent in the plane Q to the sphere deduced from the envelope S of the valve member 2 by the reduction of the value i from the radius thereof. By way of a modification, the seat could be spherical according to the same sphere, or biconical. In this case, in order to define the seat, the chord of the same sphere is divided into four equal parts and the two cones defining the seat are tangent to this sphere at the first and third quarters of this chord. The seat 33 can also be connected to the conical portions 34 and 35 by rounded corners, in which case its length is determined from the tangents to these rounded corners.

Also by way of a modification, the groove 16 could have a non-rectangular sectional shape, for example a divergent trapezoidal sectional shape, in which case it is the axial length 1 of the bottom of this groove which would be of the same order of magnitude as the axial length s of the seat. For example, a rectangular trapezium sectional shape could be envisaged with the inclined side located adjacent the shaft of the valve member, or an isosceles trapezium sectional shape. Moreover, the median plane of this groove could be offset to a certain extent with respect to the plane Q of closure of the valve member. This offsetting could be very slightly toward the plane P and, in the other direction, the limiting position of this median plane is defined in the following manner: from the circle of centre O tangent to the valve member 2 in the closed position (sphere S), the radius of this circle is extended by ten times the interference fit i. The limit median plane passes through the point thus obtained.

In use of the valve structure, the body 1, devoid of flanges, is axially clamped between the end flanges of the two pipe elements of axis X—X (not shown) by solely compression of the O-section beads 31. The diameter of these O-section beads is so chosen with respect to the dimension of the groove 8 as a function of the laws of compression of the rubber of the sleeve, to obtain the seal at service pressure under the desired clamping force, the O-section beads then completely filling the grooves 8 without leaving any free space, as would occur in the absence of the rounded corner portions 11 to 13. This guarantees an absence of subsequent creep in this region and therefore a perfect and constant seal even at high temperature. The flanges 30 have no sealing function; they are merely means for connecting the annular O-section beads 31 to the base of the U and for protecting the end of the body 1 against corrosion. These flanges are consequently subjected to no marked stress and may therefore be very thin with a resulting saving of material.

In a modification shown in FIG. 5, the branches 30$^a$ of the U are of rectangular section, the groove 8 being eliminated. Circular projections 36 axially project beyond the case 1$^a$ of the valve body. In the illustrated embodiment, these axial projections are four in number and the peaks thereof make at rest a projection of at least 2 mm and the peak angle is about 60°. When the body is clamped against the two flanges, these projections are flattened until the compression thereof balances the clamping force exerted by the flanges. In this arrangement, the thickness of the branches 30$^a$ exceeds that of the branches 30 shown in FIG. 4 since these branches undergo local compression forces in the regions of the projections 36 which constitutes a series of labyrinths providing the seal. It is therefore in order to have a certain "body" that these branches 30$^a$ have an axial thickness again equal to the depth of the recess 6$^a$ exceeding that of the embodiment shown in FIG. 4.

In service, the fluid conveyed flows in one direction or the other along the axis X—X. When the valve member is brought to the valve-closing position, it approaches the thick portion of the sleeve 3 by coming into contact with either of the part-conical portions 34 and 35.

The aforementioned inclination of these part-conical portions allows the valve member to slide toward the seating 33, on one hand without encountering a resistance on the part of the part-conical portions which might prevent it from reaching the seat and, on the other, without the seat and the two part-conical portions concerning an excessively great axial length of the sleeve.

It has been found that with the aforementioned dimensions of the seat 33, and the rounded corners 14 and 19 on the edge of the groove 16, and the projection 33$^a$ of the sleeve received in the groove, the temperature at which the creep of the elastomer becomes excessive is considerably raised. There is therefore a reduction in the creep for a given temperature which allows having a pressure of contact between the seat and butterfly valve member which is sufficient to obtain the seal without giving rise on each side of the valve member to permanent radial bends or bulges produced by removing rubber from the transverse plane of contact of the valve member which, on one hand, affects the seal by decreasing the pressure of contact, and, on the other, increases the shifting torque required by increasing the friction of the valve member against said beads.

It is thought that this surprising result is due to the very slight state of stresses to which the radially inner part of the seat is subjected, with the indicated geometry, when the valve is closed, these stresses being revealed by photo-elasticimetric tests. In particular, owing to the considerable thickness of the seat, variations in i due to manufacturing tolerances are small compared to this thickness so that the stresses in the region of the seat are maintained within narrow limits from one valve structure to another.

The described dimensions ensure a very good anchoring of the seat, even if the clamping flange has an excessively large inside diameter as shown in dot-dash line at 37 in FIG. 3. Only the part of the sleeve extending beyond the tongue portion 17 is liable to creep under the effect of the fluid pressure, but as moreover the seat has a section which is divergent toward the shaft of the valve member, even at this end of the tongue portion 17, the danger of a sliding of the seat is greatly reduced.

Another important advantage of this valve structure is that, owing to the shape and dimensions of the seat, the latter is practically the only region of the sleeve which is subjected to stresses by the valve member. The remainder of the sleeve, that is to say the web 32, consequently merely performs a function of internal protection of the body 1. The web 32, in the same way as the flanges 30, can therefore have a minimum thickness of 2 mm which results in a saving of material and a sleeve flexibility of great interest when fitting the sleeve in the valve body. Likewise, the compression of the annular O-section beads 31 does not react on the base of the U and introduces no stress therein.

FIG. 8 shows how the sleeve is sealed, where the shaft of the butterfly valve member extends therethrough, by an illustration of the detail of the right part of FIG. 1 in the case where the semi-shaft 22$^a$ extends through the cavity of the body 1 to within a lug 17 of the valve member 2. It will be understood that the diametrally opposed part of the sleeve, where the shaft 22$^b$ passes therethrough, is similar. The sleeve 3 has in this part a flat portion 38 perpendicular to the axis Y—Y of the semi-shaft 22$^a$. This flat portion permits giving to the sleeve in this part a greater thickness suitable for the forces to which it is subjected bearing in mind the passage of the shaft. There is chosen for this reinforcement a thickness which is one and a half to twice that of the remainder of the sleeve.

A short cylindrical portion 39 projects towards the valve member from the flat portion 38 and grips the semi-shaft 22$^a$. The free length of this cylindrical portion is 1 to 5 mm and the thickness thereof is 1 to 3 mm. This cylindrical portion 39 constitutes a lip and the elastic application thereof against the semi-shaft 22$^a$ is achieved by means of the moulding method illustrated in FIG. 9. The mould for manufacturing the sleeve comprises an outer ring 40 and a core 41. In the region where it is desired to form in the sleeve the aperture for the passage of the semi-shaft provided with the cylindrical portion 39 adapted to grip the semi-shaft, there is engaged, through an aperture 42, provided in the ring and having the same diameter as the semi-shaft, and in a blind aperture 43 which is of a smaller diameter and formed in the core, a member 44 which has two cylindrical portions 45 and 46 the diameters of which respectively correspond to those of the apertures 42 and 43. The difference between the diameters is equal to twice the desired length of the cylindrical portion 39. The part of reduced diameter 46 of the member 44 extends into the moulding cavity by an extent, measured along the axis of this member, which is equal to the desired thickness of the cylindrical portion 39. Starting at the shoulder located at the change of diameter of the member 44, which shoulder is perfectly radial to obtain a perfectly formed cylindrical portion 39, the increase in diameter is progressive followed by a rounded or radiused corner 47 of a quarter of a circle.

When it is removed from the mould, the sleeve 2 has the shape shown in FIG. 9. Upon assembly, the semi-shaft 22$^a$ is fitted from the exterior into its bearing 21 and progressively inwardly urges the flange of the sleeve by the chamfer 24 so as to form a pre-stressed gripping cylindrical lip 39, the hydraulic pressure subsequently established in the valve applying this lip very firmly against the semi-shaft and thereby ensuring the seal. The minimum diameter of the chamfer 24 of this semi-shaft must be less than the diameter defined by the lip before assembly and the angle of the chamfer must be preferably less than 45° relative to the generatrix of the shaft. Thus, it is possible to envisage a rounded or radiused corner instead of a chamfer. This type of seal produced by a lip is very advantageous since the fluid pressure constantly takes up any possible disappearance of the prestressing owing to creep of the material, especially at high temperature.

Note that the foregoing may be applicable, with obvious modifications, to the case of a valve having a butterfly valve member which is not offset. The assembly is then symmetrical with respect to the median plane of the body 1 and the indicated dimensional and geometric relationships are retained, except for the length of the tongue portion 17.

The rounded or radiused corners 18 provided in the bottom of the groove eliminate the risk of a cutting of the outer region of the annular projection 32$^a$ upon assembly. It is indeed necessary to deform the sleeve considerably for fitting it in the body 1 and this deformation could, in the absence of rounded corners, result in cracking which might lead to a bad distribution of the stresses. On the other hand, these rounded corners 18 become optional in the modification shown in FIGS. 6 and 7 which overcomes this problem of deformation upon assembly.

These FIGS. 6 and 7 again concern an offset butterfly valve member. They satisfy the requirements regarding retraction of the sleeve upon moulding, facility of the machining of the body and convenience of the fitting of the sleeve in the body. In this modification, the body 1 has a main part 1$^b$ through which extend the two semi-shafts 22 and whose planar end face 48 has a recess or counterbore 49 having a cylindrical wall and a planar bottom or inner face. An end member 1$^c$ completing the body 1 exactly fits into the recess 49.

The depth of this recess is limited to a value just necessary for the insertion of the second part 1$^c$ of the valve body. The inner part of the recess 49 defines the face of the groove 16$^a$ which is the nearest to the axis Y—Y, and the bottom of this groove meets this face at a sharp right angle. Apart from this difference which is also found in the sleeve 3, the inner and end configuration of the body 1 is essentially identical to that described hereinbefore.

The member 1$^c$ is employed as an insert for moulding the sleeve 3 after a suitable treatment to ensure the adherence of the elastomer. In this way, an inseparable unit 1$^c$-3 is obtained.

As mentioned hereinbefore, this modification with an insert onto which the sleeve is moulded no longer has, upon assembly, the same danger of cracking or splitting of the corners of the outer projection of the thick portion 33$^a$ upon contact with the groove. For obvious reasons of facility of machining, the inner cylindrical surface of the insert 1$^c$ may therefore remain perfectly perpendicular to the recess 49 throughout the depth thereof. On the other hand, the other end of this cylindrical surface may be provided with a sharp or rounded corner. Moreover, the moulding of the sleeve onto a partial insert which is very limited in the axial extent thereof, facilitates the maintenance of the valve by limiting the replacement, when the sleeve is desired to be replaced, to a remplacement of the sleeve itself and of a very small insert. Furthermore, the variations in the shrinkage of the elastomer upon moulding are very reduced when moulding onto an insert with an adherence treatment, since the fluctuations in the shrinkage of the elastomer are then transferred to the thickness of the seat and no longer to the diameter thereof. This therefore ensures high precision as to the inside diameters of the seat.

FIG. 10 shows a modification of the invention in which the periphery of the annular radial projection of the thick portion 33$^a$ may be pressurized at the bottom of the groove 16. This pressurization is achieved by a radial inlet 50 in the bottom of the groove 16 whereby it is possible to establish in this region the pressure of the fluid prevailing in the pipe, when this fluid is compatible with the materials of the valve body or, when this condition is not satisfied, a pressure of a compatible fluid, by way of an auxiliary pipe following the whole of the pipe which must be interrupted by such valve structures.

The possibility of such a pressurization in the bottom of the groove 16 permits the correction of the effects of creep resulting from a utilization of the valve under the effect of temperature and, possibly ignoring these effects if, owing to the pressurization, the butterfly valve member contacts the seat therefor only at the moment of closure of the valve. Moreover, in the latter case, the rubbing of the butterfly valve member against the seat is completely avoided and the shifting torque is thus completely eliminated. This arrangement may be of particular interest for chemical products. Such a valve, when pressurized, always guarantees an absolute seal with a particularly simple arrangement. This pressurization also permits prolonging the life of the valve even when it operates at a certain temperature. In combination with the design and dimensions of the annular projection of the thick portion 33ª for anchoring the seat, the pressurization enables the valve to operate almost indefinitely at temperatures close to the allowable maximum temperatures that the elastic material can withstand.

Having now described our invention what we claim as new and desire to secure by Letters Patent is:

1. A butterfly valve structure comprising means defining a valve body having a longitudinal axis and defining a rigid inner wall having an annular groove, a recess in each opposite end of the body, means defining a butterfly valve member having a median plane, means mounting the valve member in the valve body to pivot about an axis extending transversely of said longitudinal axis, an elastically yieldable sealing sleeve mounted within the valve body, the sleeve being entirely of a flexible elastomer and in one piece and having a U-shaped radial cross-section, the U-shaped defining a web and two branches extending radially outwardly from the web, said branches pertaining to two thin annular end flanges of the sleeve which respectively comprise a sealing bead at an end of the flanges remote from the web, the flanges being respectively located in the recesses and the sealing beads projecting axially beyond the opposite ends of the body, the web being cylindrical and comprising an annular thick portion, the thick portion being located in the vicinity of the median plane of the valve member in a valve-closing position of the valve member substantially between two radial planes which are substantially parallel to and disposed on opposite sides of and at substantially equal distances from said median plane, the thick portion being connected to the flanges by annular thin portions of the web and projecting radially inwardly and outwardly from said annular thin portions, the thick portion defining a seat extending between said two radial planes for the valve member and further defining an annular outer projection which extends substantially between said two radial planes and is disposed in the groove of the valve body, the projection having, in the free state thereof, the same cross-sectional shape and size as the groove and consequently being in an uncompressed state in said groove when the valve member is in a position for fully opening the valve, and the depth of the groove being equal to at least 4/10 of the minimum radial thickness of the thick portion in one of said two radial planes.

2. A valve structure as claimed in claim 1, wherein the radial thickness of the thick portion is equal to at least 10 times the depth to which the valve member penetrates the seat in the valve-closing position of the valve member and the axial extent of the bottom of the groove is of the same order of magnitude as the axial extent of the seat and the groove has rounded edges.

3. A valve structure as claimed in claim 2, wherein the web and the flanges have a thickness at the most equal to two and a half times said depth to which the valve member penetrates the seat.

4. A valve structure as claimed in claim 1, wherein each recess has on a periphery thereof an annular second groove and the corresponding flanges have on an outer periphery thereof an annular substantially O-section bead which bears against the bottom of said second grooves.

5. A valve structure as claimed in claim 4, wherein each of said second grooves has a bottom and a radially inner wall which are defined by rounded corners.

6. A valve structure as claimed in claim 1, wherein the recesses are cylindrical, the flanges being of rectangular cross-sectional shape with concentric circular projections on a face thereof opposed to the bottom of the recess.

7. A valve structure as claimed in claim 1, having an offset butterfly valve member, the seat being connected to the web on each side of the seat by a part-conical surface whose apex angle is in absolute value between 60° and arc sin 2e/D, in which e and D respectively designate the offset and the diameter of the valve member.

8. A valve structure as claimed in claim 1, having a butterfly valve member offset from said axis about which it pivots, wherein the body comprises an inner annular tongue portion one face of which tongue portion a wall of the groove and another face of which tongue portion defines an end face of one of said recesses in the body.

9. A valve structure as claimed in claim 8, wherein the tongue portion has two rounded radially inner peripheral edges and a length measured from the bottom of the groove which is equal to at least one half of the maximum radial thickness of the thick portion.

10. A valve structure as claimed in claim 1, having an offset butterfly valve member, wherein the means mounting the valve member in the valve body comprise shaft means and the body comprises a first member through which the shaft means of the butterfly valve member extends and which terminates in a face constituting a first wall of the groove, a second member, means adhering a part of the sleeve to the second member, the second member being mounted on the first member and defining the bottom and the other wall of the groove, and means rigidly centering the second member on the first member.

11. A valve structure as claimed in claim 10, wherein the bottom and the first wall of the groove meet at a sharp angle.

12. A valve structure as claimed in claim 1, wherein the means mounting the valve member in the valve body comprise two separate semi-shafts extending through the web and the web has, in the free state thereof in each region thereof where each of the semi-shafts extends therethrough, a thickened portion defining an aperture which has the same diameter as the semi-shafts and has a radial flange on a part of the length of the aperture, on an inner side of the sleeve, said radial flanges constituting cylindrical lips which grip the semi-shafts in the assembled valve structure.

13. A valve structure as claimed in claim 12, wherein the inner end of each semi-shaft has a chamfer or a rounded corner.

14. A valve structure as claimed in claim 1, wherein the bottom of the groove has means defining a radial inlet for connection to a source of fluid under pressure.

* * * * *